US007189922B1

(12) United States Patent
Rose et al.

(10) Patent No.: US 7,189,922 B1
(45) Date of Patent: Mar. 13, 2007

(54) PROTECTIVE COVERS FOR ELECTRIC COMPONENTS

(75) Inventors: Derek Rose, Mansfield, OH (US); Michael Gurski, Mansfield, OH (US); Sean McCandless, Decatur, GA (US); Jorgen Nielsen, El Paso, TX (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 11/248,601

(22) Filed: Oct. 12, 2005

(51) Int. Cl.
*H02G 3/14* (2006.01)

(52) U.S. Cl. ....................... 174/66; 174/67; 174/138 F; 220/241; 361/622

(58) Field of Classification Search .................. 174/66, 174/67, 5 R, 138 F; 220/241, 242; 361/816, 361/622
See application file for complete search history.

(56) References Cited

U.S. PATENT DOCUMENTS 3,598,900 A * 8/1971 Drake .................... 174/138 F
4,554,616 A 11/1985 McIntosh
4,641,223 A 2/1987 McIntosh
5,391,834 A 2/1995 Place
5,398,168 A 3/1995 Berestecky

FOREIGN PATENT DOCUMENTS

GB 2267604 * 8/1993

* cited by examiner

*Primary Examiner*—Dhiru R. Patel
(74) *Attorney, Agent, or Firm*—Harness, Dickey & Pierce, PLC

(57) ABSTRACT

An electrical component protective cover for an appliance has an upper portion and a lower panel portion. The upper portion forms a cavity within a housing having a plurality of walls, which form a perimeter around the electrical component. At least one vent in at least one sidewall of the housing vents air and enables moisture to escape from the interior of the housing. A strip of barrier material is positioned between an edge of the perimeter of the housing and the appliance, the barrier material being a narrow piece of a resilient caulk material to impede liquid or moisture from entering the interior of the housing. The protective cover attaches to the electrical component using attachment receptacles such as female tab recesses. The lower portion has an aperture intermediate the upper portion and the lower portion to provide electrical component access through the cover without removing the cover.

19 Claims, 4 Drawing Sheets

PROTECTIVE COVERS FOR ELECTRIC COMPONENTS

FIELD OF THE INVENTION

The invention relates to protective covers for electrical components and associated electrical connections on appliances, and is particularly suitable for use with an electric water heater. However, it should be appreciated that the invention has broader aspects and can be used in other environments.

BACKGROUND OF THE INVENTION

Many electric appliances include components having related electrical connections. It is not uncommon for such components and their electrical connections to be covered by a plastic shield so that unintended contact with the components and connections is avoided. Such known devices, however, do not prohibit unwanted moisture from coming into contact with the electrical components and connections.

In an electric water heater, for example, electrical components such as a control module and heating elements, and their related electrical connections, have the potential to come into contact with water, should the water heater tank or associated plumbing develop a water leak. In such instances, the water may damage the unprotected electrical components, affecting their operating performance, characteristics and reliability. Additionally, while liquid water may infiltrate a cover, moisture may also accumulate within a plastic cover when air conditions, such as air temperature and humidity conditions, change. This is especially true when such a cover or shield does not have proper venting capabilities.

It is therefore desirable to provide a protective cover that, in addition to acting as a protective barrier to unintended physical contact, also reduces the likelihood for occurrences of liquid coming into contact with the electrical components and electrical connections of an appliance, like an electric water heater. Furthermore, a protective cover is desired that will properly expel or vent any moisture-laden air that may accumulate inside of the cover.

SUMMARY OF THE INVENTION

The protective cover of the teachings of the present invention provides an enclosure for electrical components and electrical connections on an appliance, and is particularly suitable for use with an electric water heater.

More specifically, a flame-rated protective cover for an electrical component of an electrical appliance has an upper portion and an optional lower portion. The upper portion covers the electric control on a water heater while the lower portion covers separate connections located beneath the electric control. The upper portion utilizes a top, front, and side walls to form a cavity that houses the electric control. The front wall defines a button area that is generally more flexible than the balance of the protective cover to permit activation of a reset button on the electrical component when the button area is pressed. The upper portion has at least one integral vent located in a sidewall, for example, that permits the interior cavity of the housing to vent off any accumulated moisture.

A moisture resistant barrier material is installed along the length of at least one wall edge of the upper portion. When the cover is installed against an appliance, the moisture resistant material seals out liquid water and water vapor. The lower portion permits access to the electric control and since it has no sidewalls, the lower portion works in conjunction with the upper vent to permit flow-through venting. Intermediate to the upper and lower portions is an aperture that permits access to connections of the electric control so that the cover does not have to be removed.

A raised rib or bead of material extends around the periphery of the upper portion to provide rigidity against bending and contact. The rib may also act as a mounting area for the moisture resistant material. The protective cover attaches to the electric control by any acceptable means such as a tab-receptacle arrangement, tab-socket arrangement, tab-slot arrangement, tongue and groove arrangement, screws or other press-fit or fastener arrangement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
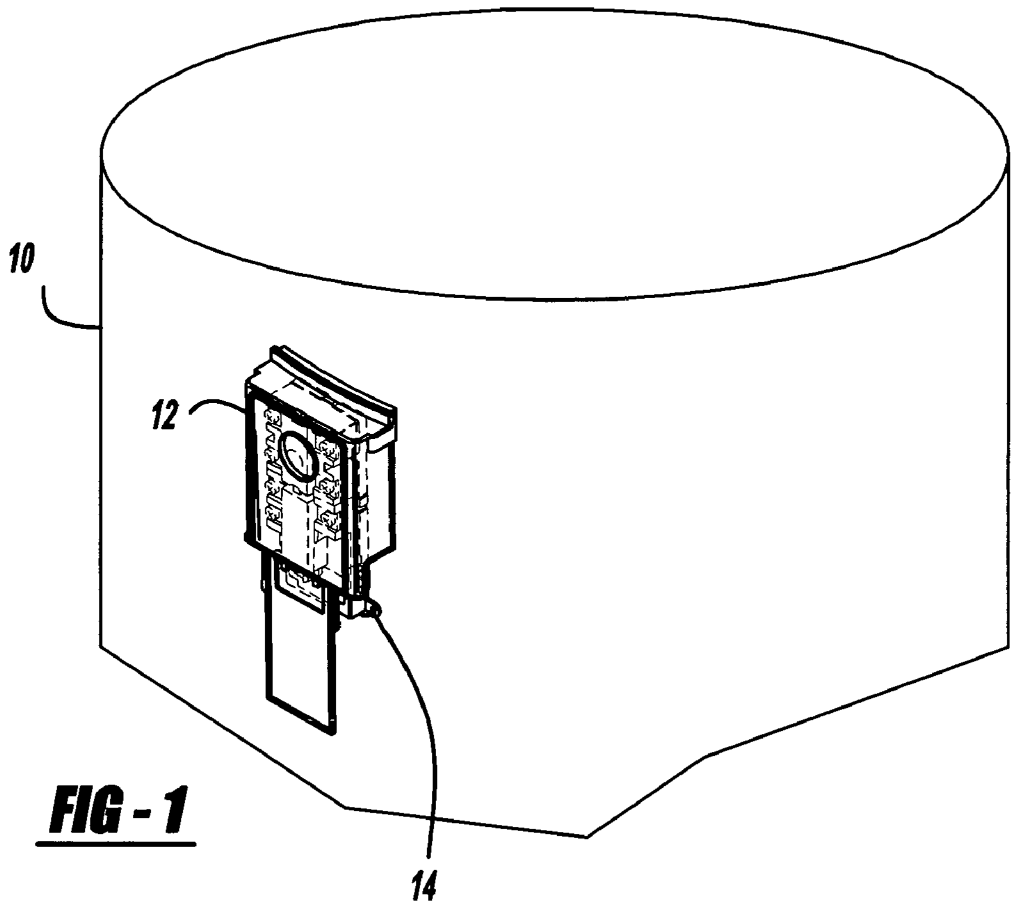
FIG. 1 is a perspective view of a water heater depicting an electrical component and an electrical component cover according to the teachings of the present invention.

The following description of the preferred embodiments is merely exemplary in nature and is in no way intended to limit the invention, its application, or uses. The protective cover according to teachings of the present invention is depicted in FIGS. 1–7. As shown and described further herein, the protective cover provides an enclosure for electrical components and associated electrical connections for an appliance and, as shown in FIG. 1, is particularly suitable for use as a protective cover or shield for the controls on an electric water heater. Of course, additional uses and applications for the invention will become apparent upon a review of the drawings and description that follows.

Figure 2:
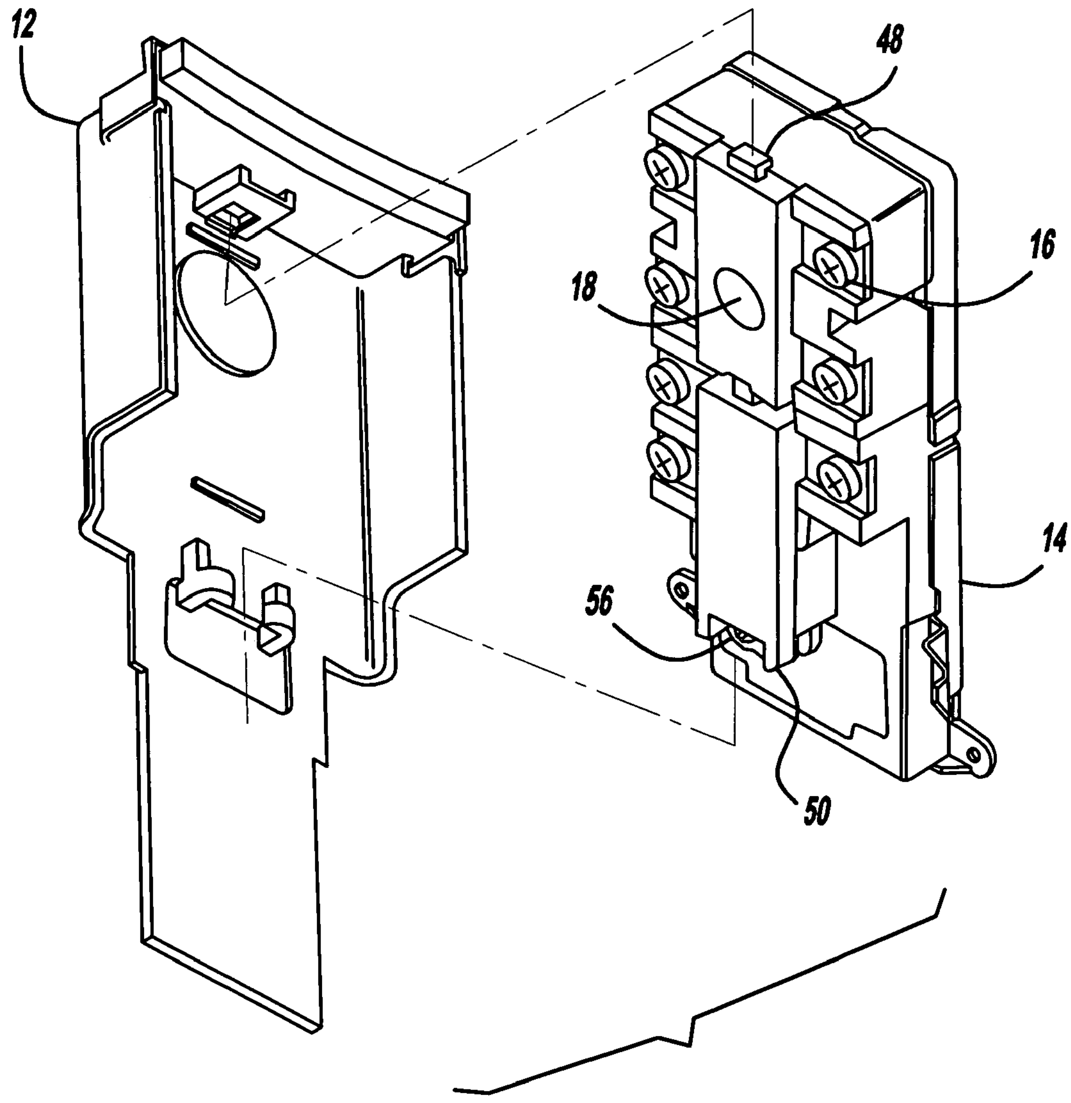
FIG. 2 is a perspective view of the electrical component cover and its alignment with mounting tabs prior to installation on the electrical component.

FIG. 1 depicts a water heater 10 as an exemplary appliance to which the protective cover 12 is applied. As best depicted in FIG. 2, an electric control 14, such as a thermostat, is located under or behind the protective cover 12. The electric control 14 generally contains a multitude of electrical connectors 16 and a reset button 18. The electrical connectors 16 carry electrical current that is used in operation of the appliance 10. Protecting the electric control 14 from human contact and from moisture, be it water vapor or liquid water, for example, is desirable and accomplished with the protective cover 12.

The protective cover 12 acts as a housing 20, which may be made from a single piece of molded plastic and which may have a fluid and moisture resistant barrier 22 positioned about the perimeter of at least a portion of the housing 20. The housing 20 provides an enclosure for covering the electrical component 14 and a connection 48, 50 onto which the protective cover 12 is installed. The enclosure is formed by a plurality of walls or panels that join together to define an interior space or cavity enclosed by the housing 20.

As depicted amongst FIGS. 2–7, a top wall 24, a first side wall 26, a second side wall 28 and a front wall 30 join together to form the upper portion of the protective cover 12. The top wall 24 and side walls 26, 28 form a perimeter of the housing 20 that, when installed, surrounds the electrical component 14 and lies adjacent to the appliance 10 on which it is installed.

The geometrical configuration of the housing 20 is dependent upon the structure of the particular electrical component over which the housing is installed. As shown in the figures, the upper portion of the protective cover 12 has generally, a rectangularly-shaped, box-like configuration. This geometry is merely exemplary and the protective cover can be a multitude of other shapes as applications might demand.

Figure 4:
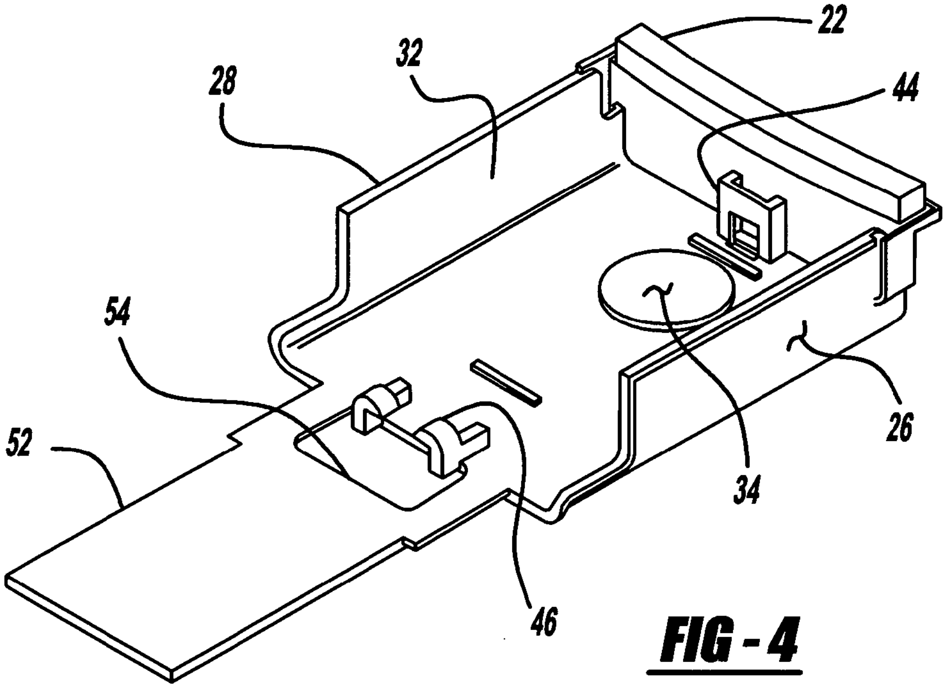
FIG. 4 is a perspective view of the electrical component cover rear surface according to the teachings of the present invention.
Figure 5:
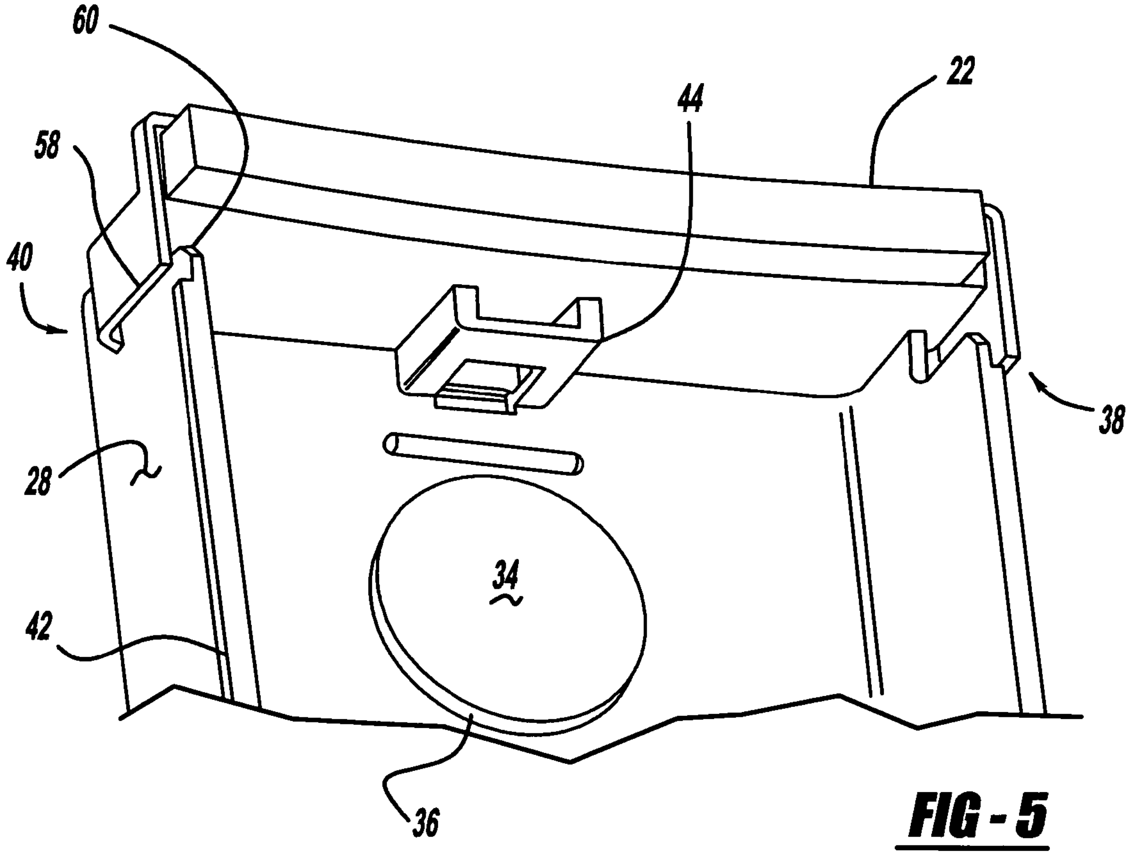
FIG. 5 is an enlarged end view depicting a contoured surface of the electrical component cover with a moisture barrier along a top wall according to the teachings of the present invention.
Figure 6:
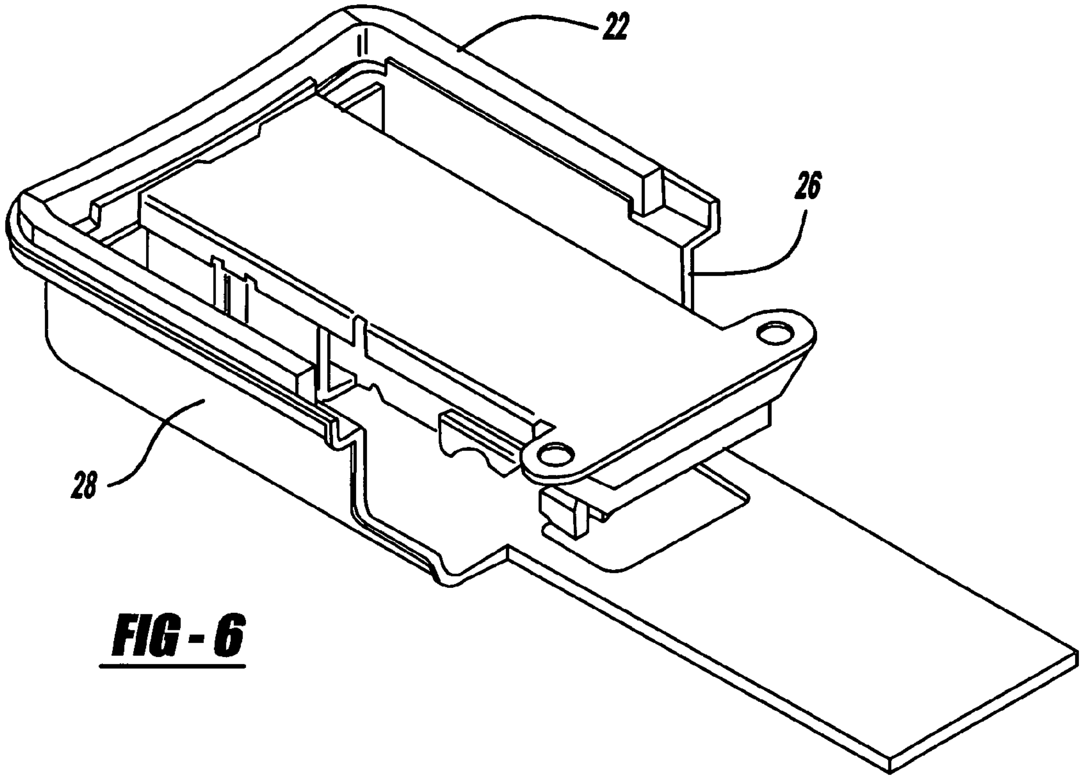
FIG. 6 is a perspective view of the electrical component cover rear surface depicting a moisture barrier along three walls according to the teachings of the present invention.

Optionally, a barrier material 22, which provides an obstruction against liquid and/or moisture-laden air from entering into the cavity 32, that is, the interior of the housing 20, is provided. The barrier material 22 is located about at least portions of the perimeter of the housing 20. As best depicted in FIGS. 2–5, the barrier material 22 may be positioned along at least the edge of the top wall 24, on the side of the protective cover that is opposite the front wall 30. Preferably, the barrier material 22 may also be included along the edges of the side walls 26, 28, as shown in FIG. 6, to form a continuous piece of barrier material along three edges of the housing 20. When installed in this fashion, the barrier material 22 provides resistance to moisture along three walls of the housing.

Figure 3:
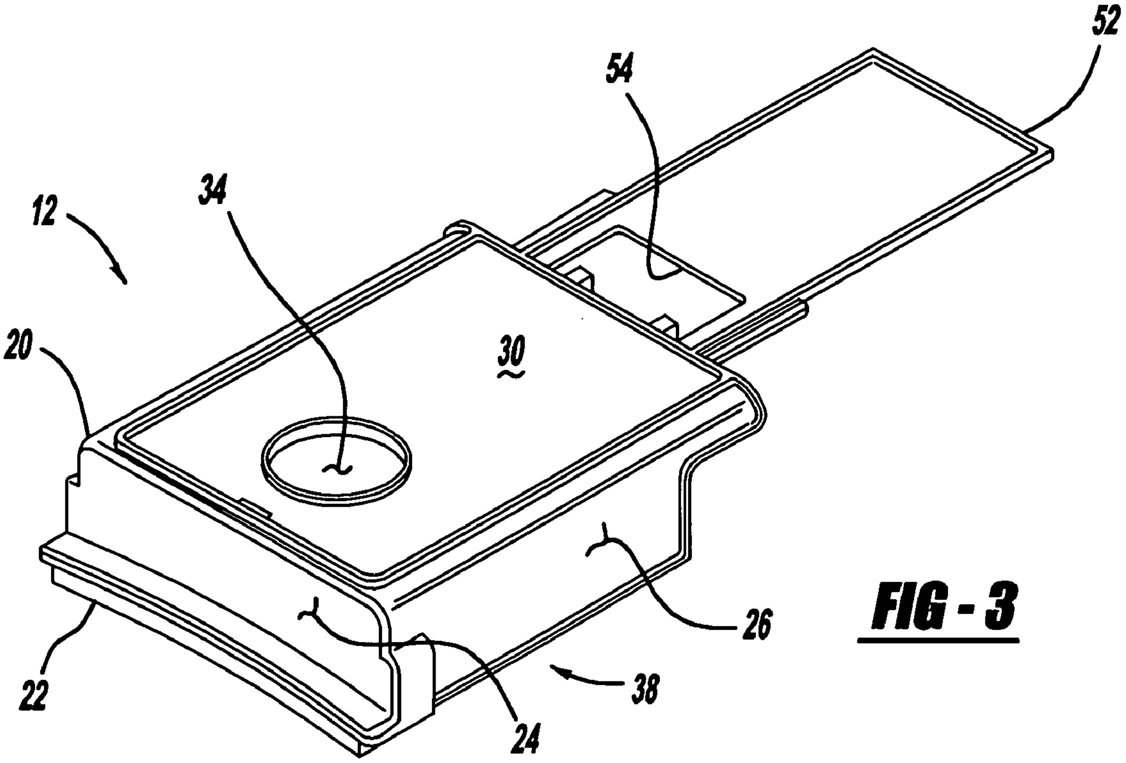
FIG. 3 is a perspective view of an electrical component cover front surface according to the teachings of the present invention.
Figure 7:
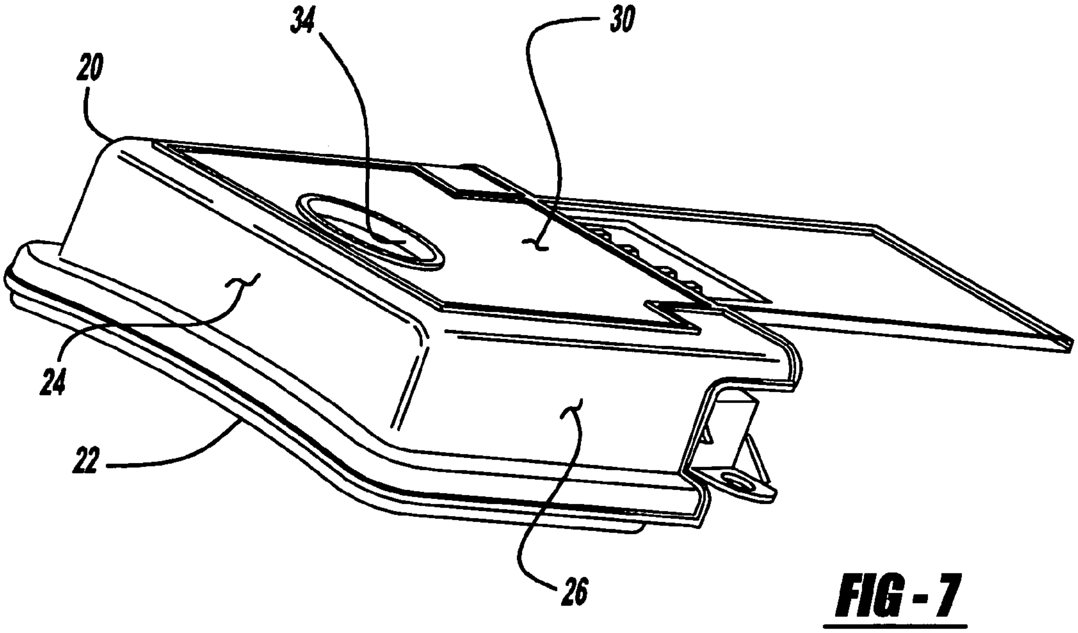
FIG. 7 is a perspective view of the electrical component cover depicting a contoured wall with moisture barrier along three walls according to the teachings of the present invention.

The barrier material 22 serves to inhibit liquid and water vapor from entering the interior of the housing 20 between the housing walls and the appliance to which it is installed by closely fitting against a surface of the appliance upon which it is mounted. As best illustrated in FIGS. 3, 4 and 7, the top wall 24 may include a slight radius or curvature to permit the housing 20 to match the contour of the appliance to which it abuts. The contour could be any that permits an acceptable seal between the barrier material 22 and the appliance wall. The barrier material 22 prevents water, or any liquid, from entering the housing 20. A seal is created to prevent such entry and the seal can extend to all three sides of the housing as shown in FIG. 6. While the housing 20 and barrier 22 prevent water and other liquids from entering the cavity 32, the housing 20 also provides a physical barrier between the electric control 14 and any conductive material that might otherwise fall into or come into contact with the contacts of the electrical connectors 16. By its mere geometric construction, the housing 20 acts as a barrier between the electrical connectors 16 and anything that might come into contact with the exterior of the housing 20. In addition to this advantage, the housing 20 provides access to a lower electrical connection area 56 without removal of the housing 20, to be further discussed below.

The barrier material 22 may be made of any material that is capable of sealing out moisture and conforming to the contour of the abutting appliance. Examples of suitable materials consist of rubbers and plastics of various hardnesses as determined by, for example, the Shore (Durometer) hardness test. The same Shore hardness test can also be used for softer plastics such as polypropylenes, polyolefins, fluoropolymers, and vinyls, which may also serve as suitable sealing materials for the moisture barrier of the housing 20. The barrier material may be fastened to the housing using any acceptable means such as glue, double-faced tape, or other adhesive or a mechanical fastener such as screws.

The material of the protective cover 12 and housing 20 can be any of a wide range of dielectric materials, such as plastics, that preferably, are flexible enough to accommodate a button area 34. The button area 34 of the housing 20 is preferably a pliable area that, upon force by external contact (e.g., the force of a finger) will flex to the extent necessary to activate a reset button 18 of the electric control 14. In this fashion, the integrity of the moisture barrier is maintained over the electric control 14. The reset button 18 is located on the front of the electric control 14 and in an area that is generally behind the button area 34. In the event that the button area 34 is not made of a flexible material, then a separate and distinct button secured within a front aperture of the front wall 30 can be utilized. The separate piece may slide within the aperture or the separate piece may be a pliable piece, such as rubber, and affixed about the periphery of the aperture with an adhesive such as a moisture resistant silicone adhesive. As depicted in FIG. 5, even if the button is a separate piece, the piece would also form a barrier seal, at a flexible button area 36, with the housing 20 to prevent moisture and water vapor from entering the cavity 32. A preferred material of the housing is a flame-rated polypropelene; however, any flame-rated material capable of being formed into a rigid shell suitable for use near electrical connections can be used.

Preferably, at least one vent 38, 40, which may be in the form of a baffle, is provided in the housing 20. Either vent 38, 40, may be formed by an outer wall portion 58 and a corresponding tip 60 of a side wall 28. As depicted in FIG. 5, the outer wall portion 58 may be parallel to and overlap the side wall 28. A vent may be formed on each side of the protective cover 12, or elsewhere in the cover.

In the event of changing atmospheric conditions throughout the weather seasons, the cavity 32 of the housing 20 can be kept free of condensation resulting from moisture-laden air. As best depicted in FIG. 5, a first vent 38 and a second vent 40 are included, respectively, in the first side wall 26 and second side wall 28. The vents 38, 40 provide an opening through the housing 20 that permits moisture, for example, in the form of moisture-laden air, to escape from the interior cavity 32 of the housing 20. By providing an outlet for water vapor, the formation of condensation on the interior surface of the housing 20 can be avoided. When water vapor is prevented from collecting, then eliminating drops of water from falling from the interior walls of the protective cover 12 is possible. This ensures the integrity of the electrical connections.

By preventing water droplets from forming on the interior surface of the housing 20, an advantage related to electric arc prevention becomes evident. Arc tracking between electrical connectors 16 of the electric control 14 is possible if water were to come into contact with the electrical connectors 16 or if the moisture or humidity level were to become excessive. Arc tracking is the formation of a conducting path across the surface of an insulating material by arc discharge. Arc tracking can cause damage to the insulating material between the electrical connectors 16 of the electric control 14 and degrade the integrity of the insulating material. The extent of any damage is dependent upon the arc resistance of the material used. Arc resistance is a measure for the insulation characteristics of a material against a voltage arc. More specifically, arc resistance is the number of seconds that a material resists the formation of a surface conducting path when subjected to an intermittently occurring voltage arc, the voltage arc normally being of relatively high voltage and relatively low current. By preventing moisture from coming into contact with the electrical connections, such as by venting the protective cover 12 with vents 38, 40, arc tracking can be avoided.

The top wall 24, first side wall 26, and second side wall 28 may contain a flange 42 or bead of material that runs the length of the respective wall to provide rigidity to the wall and as a result, rigidity to the housing 20. Additionally, the flange 42, as depicted in FIG. 6, not only adds rigidity to the housing 20 to prevent permanent bending, but also acts as a mounting surface for the barrier material 22. By adding rigidity to the housing 20, the housing 20 is more likely to maintain its shape if struck by an object or if it makes contact with a person.

The protective cover 12 has an optional lower portion 52 that is a generally flat wall or panel. A generally rectangular aperture 54 or access opening can be provided in the lower portion 52 of the protective cover 12. The aperture 54 enables easy access by a technician to features of the electrical component, such as a knob, setting indicator, or lower electrical connection area 56, for example, without necessitating the removal of the protective cover 12 from the component. Additionally, because the lower panel 52 of the protective cover 12 is essentially flat and the housing 20 does not have a bottom wall, the area behind the lower panel is open into the cavity 32 of the housing 20. Because this area is not enclosed, another venting area is provided for the housing 20. This adds to the venting capabilities of the housing 20 by permitting a flow-though effect from the top of the housing 20 to the bottom of the housing 20, via vents 38, 40.

Installation of the protective cover onto the electrical component is generally shown in FIG. 1. The protective cover 12 easily attaches to the electric control 14 using any acceptable means for attaching the cover 12 to the control 14. Examples of acceptable means are receptacles or sockets 44, 46 on the inside surface of the front wall 30 with corresponding protruding tabs 48, 50 on the electric control 14. The protruding first tab 48 of the electric control 14 inserts into the first socket 44 of the housing 20. The protruding second tab 50 of the electric control 14 inserts into the second socket 46 of the housing 20. To provide for an effective locking of the protective cover 12 onto the electric control 14, the second socket 46, which is the bottom socket in FIG. 4, simply presses down onto the second tab 50 in order to surround the second tab 50. The first socket 44 then presses onto the first tab 48. Installing the protective cover 12 in this fashion effectively secures the protective cover 12 onto the electric control 14. This ensures that the protective cover 12 will not be easily removed from the electric control 14 if it is incidentally contacted by a person or object.

Once installed, the effective operation of the protective cover becomes evident. First, the button area 34 can be pressed to activate the reset button 18 of the electric control 14. Since the button area 34 can be made of the same continuous piece of plastic material as the front wall 30, the cover operates to prevent any water or moisture from gaining access behind the cover 12. Additionally, because the protective cover 12 employs a fluid resistant barrier 22 that creates a seal with the water heater 10 or appliance to which it is installed, the protective cover operates to prevent any liquid or moisture from gaining access to the cavity 32 of the protective cover 12 in the interface between the barrier 22 and the appliance 10.

When the protective cover 12 is installed on an appliance 10 with the optional lower portion 52, additional advantages are evident. One advantage is that the lower portion 52 acts as a barrier between anything that might contact the outside surface of the lower portion 52 and the electric control 14. Since the lower portion 52 can be made of plastic materials of varying flexibility, access to the electrical connectors 16 is possible without having to remove the protective cover 12. Although access is possible, a deliberate force is necessary to gain access. Additionally, the lower portion 52 provides access to a group of electrical connectors 16 through the aperture 54 in the lower portion. Because of the location of the aperture 54 between the upper housing 20 and the lower portion 52, easier flexing of the lower portion 52 is possible since there is less material to bend. While the material that connects the lower portion 52 to the upper housing 20 can be bent, a hinge (not shown) could be included to join the housing 20 and the lower portion 52 to facilitate lifting or adjustment in position of the lower portion 52 relative to the upper housing 20. In another operative working of the protective cover 12, access to the electrical connectors 16 of the electric control 14 from below or under the lower portion 52 is possible when the protective cover 12 is installed in its normal location.

Manufacturing of the protective cover 12 can generally be accomplished by molding it from a dielectric plastic material in one-piece. The barrier strip material can thereafter be attached to the molded component with an adhesive. Again, other alternatives for attaching the barrier strip material may include the use of traditional fasteners such as screws or rivets. Alternatively, the barrier strip can be integrally molded in situ with the protective cover. Still further, the barrier material may simply form a press fit against the housing 20, or a wedge fit within the flange 42 and a wall portion as depicted in FIG. 6. Finally, when the protective cover is made of a material that is itself suitable for sealing, the barrier strip may be molded as part of the protective cover.

Advantages of the teachings of the present invention are numerous. The protective cover 12 provides a barrier between the electric control 14 and a human or object positioned next to the control. The protective cover 12 prevents objects from coming into electrical contact with the electrical connectors 16 located behind the front wall 30 of the housing 20. The protective cover 12 also prevents moisture in the form of water vapor, and water in the form of a continuous stream or individual drops, from entering or condensing in the cavity 32 located within the housing 20. The advantage of this aspect is that the electrical connectors 16 are prevented from coming into contact with water, which may be present, for example, in any leaking pipes or connections leading into and out of a water heater. Another advantage is the ability to activate a reset button on the electric control 14 without removing the protective cover 12 from the electric control 14. Therefore, activating the reset button can be accomplished more easily, quickly, and without a user having to interface with any electrical connectors 16.

Other advantages of the teachings of the present invention relate to the lower portion 52 of the protective cover 12. Because the lower portion 52 is limited to essentially a flat panel, as depicted in FIG. 7, access to the electrical connectors 16 of the electric control 14 from below or under the lower portion 52 is possible when the protective cover 12 is installed in its normal location. That is, the entire protective cover 12 does not need to be removed. Additionally, because the lower portion 52 is essentially a flat panel, it can easily be bent to permit access to the electrical connectors 16. Finally, because the lower portion 52 permits air to reach the electric control 14, the atmosphere around the electrical connectors 16 is constantly being vented through the bottom of the housing 20. Furthermore, the vents 38, 40 act in conjunction with the access area of the lower portion 52 to provide a flow-through design to improve ventilation and avoid condensation of any moisture.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cover for an electrical component, comprising:

a front wall;

at least one side wall that abuts the front wall;

a top wall that abuts the front wall, thereby forming a housing with an interior cavity, wherein the top wall protrudes beyond and overlaps the at least one side wall such that an overlapping portion of said top wall is parallel to the side wall; and an air passage defined between the overlapping portion and the at least one side wall.

2. The cover of claim 1, further comprising:

means for attaching the cover to the electrical component.

3. The cover of claim 2, wherein the means for attaching comprises a plurality of attachment receptacles.

4. The cover of claim 1, further comprising:

a flexible button area located on the front wall.

5. A cover for an electrical component, comprising:

a front wall;

at least one side wall that abuts the front wall;

a top wall that abuts the front wall, thereby forming a housing with an interior cavity, wherein the top wall protrudes beyond and overlaps the at least one side wall such that an overlapping portion of said top wall is parallel to the side wall; and a moisture-resistant barrier material disposed upon an edge of the top wall.

6. A cover for an electrical component, comprising:

a front wall;

at least one side wall that abuts the front wall;

a top wall that abuts the front wall, thereby forming a housing with an interior cavity, wherein the top wall protrudes beyond and overlaps the at least one side wall such that an overlapping portion of said top wall is parallel to the side wall; and a lower panel portion attached to and extending from the front wall.

7. The cover of claim 6, wherein the lower panel portion defines an aperture.

8. The cover of claim 7, wherein the lower panel portion defines a gap with the appliance to which the cover is attached to permit access to the electrical components.

9. In a combination of an electric appliance component and a protective cover for electric components, the combination comprising:

an upper portion, the upper portion comprising:

a housing defined by a top wall, a first side wall, a second side wall, and a front cover, wherein the side walls intersect the top wall and the front wall, and a vent in at least one of the side walls; and a lower portion, the lower portion comprising:

a panel that is connected to, and defines an aperture with, the upper portion to permit access to the electrical component.

10. The combination of claim 9, further comprising:

a resilient button portion in the upper portion, operable to permit operation of the electric component.

11. The combination of claim 10, wherein the top wall is contoured to accommodate an appliance mounting surface to which the top wall abuts.

12. The combination of claim 10, further comprising:

a first sealing material located along the top wall operable to prevent moisture from entering the housing at the top wall.

13. The combination of claim 12, further comprising:

a plurality of attachment sockets located on the rear surface of the front wall, wherein the sockets interface with corresponding tabs on the electrical component.

14. The combination of claim 13, further comprising:

a second sealing material located along the first side wall operable to prevent moisture from entering the housing at the first side wall; and a third sealing material located along the second side wall operable to prevent moisture from entering the housing at the second side wall.

15. A protective cover for an electrical component on an appliance, the cover comprising:

an upper portion;

a lower portion adjacent the upper portion;

the upper portion comprising a housing, the housing comprising:

a plurality of walls enclosing an interior portion of the housing and forming a perimeter of the housing, the plurality of walls including a top wall and opposite side walls;

at least one vent in at least one sidewall of the housing, the vent providing an opening through the sidewall to enable moisture to escape from the interior of the housing;

a front wall, the front wall comprising a button portion which may be depressed to contact an actuator of the electrical component; and a seal positioned along an edge of the perimeter of the housing to impede liquid or moisture-laden air from entering the interior of the housing.

16. The protective cover of claim 15, wherein the vent is a baffle.

17. The protective cover of claim 15, further comprising:

means for attaching the protective cover to the electrical component.

18. The protective cover of claim 17, wherein the attaching means comprises a plurality of attachment receptacles including a female tab recess.

19. The protective cover of claim 15, further comprising:

a panel that is part of the lower portion and defines an aperture located intermediate the upper portion and the lower portion, the aperture providing access to the electrical component through the cover without necessitating removal of the cover from the electrical component.

* * * * *